(12) United States Patent
Yamashita et al.

(10) Patent No.: US 7,897,245 B2
(45) Date of Patent: Mar. 1, 2011

(54) BONDED STRUCTURE

(75) Inventors: Kazuyuki Yamashita, Toyama (JP); Mieko Omotani, Toyama (JP); Takashi Onaga, Takaoka (JP); Kiyokazu Himi, Takaoka (JP)

(73) Assignees: Richell Corporation (JP); Toyama Prefecture (JP)

( * ) Notice: Subject to any disclaimer, the term of this patent is extended or adjusted under 35 U.S.C. 154(b) by 0 days.

(21) Appl. No.: 12/484,387

(22) Filed: Jun. 15, 2009

(65) Prior Publication Data

US 2009/0252928 A1     Oct. 8, 2009

Related U.S. Application Data

(63) Continuation of application No. 11/725,241, filed on Mar. 16, 2007, now Pat. No. 7,566,503, which is a continuation of application No. PCT/JP2006/312165, filed on Jun. 16, 2006.

(30) Foreign Application Priority Data

Jun. 17, 2005    (JP) .................................. 2005-178613

(51) Int. Cl.
    *B32B 3/00*       (2006.01)
    *B32B 3/30*       (2006.01)

(52) U.S. Cl. ......... 428/167; 428/172; 428/451; 428/515; 428/516; 428/517

(58) Field of Classification Search .................. 428/167, 428/172, 451, 515, 516, 517
See application file for complete search history.

(56) References Cited

U.S. PATENT DOCUMENTS

| | | |
|---|---|---|
| 5,109,069 A | 4/1992 | Shibata .......................... 525/152 |
| 5,418,065 A | 5/1995 | Fujiki ............................ 428/451 |
| 5,576,101 A | 11/1996 | Saitoh et al. .................. 428/332 |
| 2006/0127282 A1 | 6/2006 | Yamashita et al. ............. 422/100 |
| 2010/0123273 A1 | 5/2010 | Yamashita .................. 264/328.1 |

FOREIGN PATENT DOCUMENTS

| | | |
|---|---|---|
| DE | 43 43 027 A1 | 6/1994 |
| EP | 0 881 258 A2 | 12/1998 |
| JP | 1-207370 | 8/1989 |
| JP | 02-158643 | 6/1990 |
| JP | 06-171022 | 6/1994 |
| JP | 06-287365 | 10/1994 |
| JP | 3515784 | 1/2004 |
| WO | WO 94/29400 | 12/1994 |

OTHER PUBLICATIONS

International Search Report, dated Oct. 3, 2006.
Database WPI Week 198939, "XP-002515348", Thomson Scientific, London, GB 1989-282614.
European Search Report dated Mar. 9, 2009.

*Primary Examiner* — D. S Nakarani
(74) *Attorney, Agent, or Firm* — Harness, Dickey & Pierce, P.L.C.

(57) ABSTRACT

A bonded structure formed by bonding a first structure and a second structure at opposed bonding surfaces to form a microstructure or the like. At least one of the first structure and the second structure is formed of a resin composition including a polypropylene resin and a hydrogenated derivative of a block copolymer of the following general formula X-Y (X is a polymer block immiscible with the polypropylene resin, and Y is a conjugated diene elastomer polymer block). The bonding surfaces are bonded by heating an alkoxysilane or alkylsilane compound or a mixture prepared by adding a hydrogenated derivative of a block copolymer of the general formula X-Y to an alkoxysilane or alkylsilane compound applied to the bonding surface.

3 Claims, 9 Drawing Sheets

FIG. 1

| | Structure 1 Hydrogenated derivative mixing ratio(%) | Structure 2 Hydrogenated derivative mixing ratio(%) | Bonding layer | Bonding temperature | Bondability evaluation |
|---|---|---|---|---|---|
| 1 | 5 (immediately after molding) | 5 (immediately after molding) | Hexamethyldisilazane | 110 °C | 0 |
| 2 | 10 (↑) | 10 (↑) | ↑ | ↑ | 0 |
| 3 | 20 (↑) | 20 (↑) | ↑ | ↑ | 0 |
| 4 | 30 (↑) | 30 (↑) | ↑ | ↑ | 1 |
| 5 | 40 (↑) | 40 (↑) | ↑ | ↑ | 2 |
| 6 | 50 (↑) | 50 (↑) | ↑ | ↑ | 3 |
| 7 | 66 (↑) | 66 (↑) | ↑ | ↑ | 4 (structure was deformed) |
| 8 | 50 (↑) | 50 (↑) | ↑ | 120 °C | 2 |
| 9 | 50 (↑) | 50 (↑) | ↑ | 90 °C | 1 |
| 10 | 50 (dried at 50°C) | 50 (dried at 50°C) | Isobutyltrimethoxysilane | 110 °C | 8 |
| 11 | 50 (↑) | 50 (↑) | n-Octyltrimethoxysilane | ↑ | 7 |
| 12 | 50 (↑) | 50 (↑) | Hexamethyldisilazane | ↑ | 6 |
| 13 | 50 (↑) | 50 (↑) | Tetramethoxysilane | ↑ | 5 |
| 14 | 50 (↑) | 50 (↑) | 3-Glycidoxypropyltrimethoxysilane | ↑ | 6 |
| 15 | 50 (↑) | 50 (↑) | 3-Methacryloxypropyltrimethoxysilane | ↑ | 6 |
| 16 | 50 (↑) | 50 (↑) | 3-Aminopropyltrimethoxysilane | ↑ | 0 |

FIG. 2

| Silane compound | Structure | | Weight increase rate (%) |
|---|---|---|---|
| | Before immersion (g) | After immersion (g) | |
| Tetramethoxysilane | 0.351 | 0.375 | 6.8 |
| Hexamethyldisilazane | 0.351 | 0.522 | 48.7 |
| Isobutyltrimethoxysilane | 0.350 | 0.468 | 33.7 |
| n-Octyltrimethoxysilane | 0.350 | 0.520 | 48.6 |
| 3-Glycidoxypropyltrimethoxysilane | 0.350 | 0.353 | 0.9 |
| 3-Methacryloxypropyltrimethoxysilane | 0.351 | 0.358 | 2.0 |
| 3-Aminopropyltrimethoxysilane | 0.350 | 0.355 | 1.4 |

BONDED STRUCTURE

CROSS REFERENCE TO RELATED APPLICATION

This application is a continuation of U.S. patent application Ser. No. 11/725,241 filed Mar. 16, 2007, which is a continuation of International Patent Application No. PCT/JP2006/312165, having an international filing date of Jun. 16, 2006, which designated the United States, the entirety of which is incorporated herein by reference. Japanese Patent Application No. 2005-178613 filed on Jun. 17, 2005 is also incorporated herein by reference in its entirety.

BACKGROUND OF THE INVENTION

The present invention relates to a bonded structure obtained by bonding a plurality of structures, a microstructure, and a microproduct.

It is particularly effective to apply the invention to a microstructure and a microproduct used in the fields of biochemistry, biotechnology, optics, electrics and electronics, and the like, such as a micromechanical switching element, microoptics, a microfluid, a microchemical reactor, a microbioreactor, a microdevice, a microchannel, and a microwell array chip.

As a method of forming a microchannel through which a sample or a reactive liquid is caused to flow, a method has been studied which includes providing a plurality of structures, forming a two-dimensional or three-dimensional open microstructure such as an open channel or an open hole in at least one of the structures, and bonding the other structure having a flat and smooth surface to the structure in which the open microstructure is formed to obtain a microstructure.

For example, Japanese Patent No. 3515784 discloses technology of applying to bonding surfaces of structures a solution prepared by dissolving a material having a melting point lower than that of the structures in a solvent, removing the solvent, and bonding the structures by heating. However, an appropriate bonding agent does not exist when producing at least one of the structures using a polypropylene resin. Therefore, bonding strength may be low, or a microstructure may be deformed when employing a high heating temperature.

When producing a microproduct without a channel such as a microwell array chip, it may be necessary to provide a liquid leakage preventive frame around the well array so that leakage of a sample poured into the well array does not occur. In this case, a solvent or the like may enter the space between the bonding surfaces of the microwell array chip and the liquid leakage preventive frame, whereby leakage of a liquid may occur.

SUMMARY

According to one aspect of the invention, there is provided a bonded structure comprising a first structure and a second structure, the first structure and the second structure having opposed bonding surfaces, at least one of the first structure and the second structure being formed of a resin composition including a polypropylene resin and a hydrogenated derivative of a block copolymer of the following general formula X-Y (X is a polymer block immiscible with the polypropylene resin, and Y is a conjugated diene elastomer polymer block), and the bonding surfaces being bonded by heating an alkoxysilane or alkylsilane compound applied to the bonding surface of at least one of the first structure and the second structure.

According to another aspect of the invention, a microstructure may comprise an open microstructure in at least one bonding surface of the above bonded structure.

According to a further aspect of the invention, a microproduct may comprise N structures (N is an integer equal to or larger than three).

According to a further aspect of the invention, there is provided a microproduct used for biochemistry or biotechnology, the microproduct being formed of the above resin composition and comprising a channel groove with a width and a depth each having 0.3 to 200 μm.

BRIEF DESCRIPTION OF THE SEVERAL VIEWS OF THE DRAWING

FIG. 1 shows structure bonding results.
FIG. 2 shows permeation test results of a silane compound into a structure.

DETAILED DESCRIPTION OF THE EMBODIMENT

Figure 3:
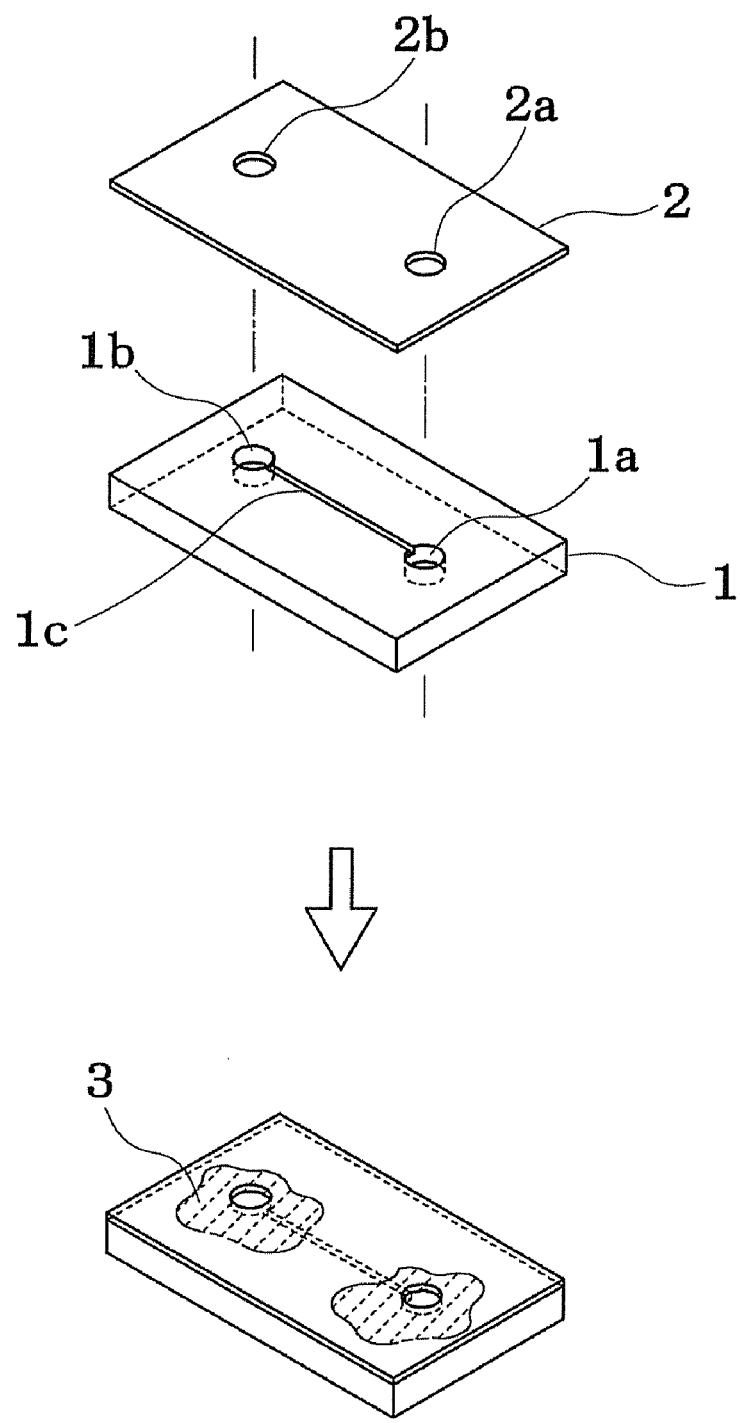
FIG. 3 shows an example of a microstructure.

In view of the above background art, an objective of the invention is to provide a bonded structure exhibiting excellent bondability of bonding surfaces of a plurality of structures, a microstructure, and a microproduct.

According to one embodiment of the invention, there is provided a bonded structure comprising a first structure and a second structure, the first structure and the second structure having opposed bonding surfaces, at least one of the first structure and the second structure being formed of a resin composition including a polypropylene resin and a hydrogenated derivative of a block copolymer of the following general formula X-Y (X is a polymer block immiscible with the polypropylene resin, and Y is a conjugated diene elastomer polymer block), and the bonding surfaces being bonded by heating an alkoxysilane or alkylsilane compound applied to the bonding surface of at least one of the first structure and the second structure.

According to another embodiment of the invention, there is provided a microstructure comprising a first structure and a second structure, the first structure and the second structure having opposed bonding surfaces and an open microstructure formed in at least one of the bonding surfaces, at least one of the first structure and the second structure being formed of a resin composition including a polypropylene resin and a hydrogenated derivative of a block copolymer of the following general formula X-Y (X is a polymer block immiscible with the polypropylene resin, and Y is a conjugated diene elastomer polymer block), and the bonding surfaces being bonded by heating an alkoxysilane or alkylsilane compound applied to the bonding surface of at least one of the first structure and the second structure.

The open microstructure formed in the bonding surface is selected depending on the application such as a microbioreactor. The term "open microstructure" used herein refers to a channel groove, a depression, or the like having a width and a depth of about 0.3 to 200 μm. The structure according to the invention is effectively applied to a microstructure having dimensions of 1 to 50 μm.

As the polypropylene resin, a polypropylene homopolymer or a polypropylene random copolymer including an α-olefin such as ethylene, butene-1, or hexene-1 may be used.

As examples of the polymer block X, a polymer produced by polymerizing vinyl aromatic monomers (e.g. styrene), ethylene, methacrylate (e.g. methyl methacrylate), or the like can be given.

The hydrogenated derivative of the block copolymer of the general formula X-Y includes copolymers shown by $(X-Y)_n$ (n=1 to 5), X-Y-X, Y-X-Y, and the like.

As examples of the polymer block X of the hydrogenated derivative, a polystyrene polymer block and a polyolefin polymer block can be given. As examples of the polystyrene polymer block, a polymer block including one or more vinyl aromatic compounds selected from styrene, α-methylstyrene, o-methylstyrene, m-methylstyrene, p-methylstyrene, 2,4-dimethylstyrene, vinylnaphthalene, and vinylanthracene as the monomer unit can be given.

As examples of the polyolefin polymer block, copolymers of ethylene and an α-olefin having 3 to 10 carbon atoms can be given.

A nonconjugated diene may be polymerized in the polymer block.

As examples of the olefin, propylene, 1-butene, 3-methyl-1-butene, 1-pentene, 4-methyl-1-pentene, 1-hexene, 1-pentene, 1-octene, 1-decene, and the like can be given.

As examples of the nonconjugated diene, 1,4-hexadiene, 5-methyl-1,5-hexadiene, 1,4-octadiene, cyclohexadiene, cyclooctadiene, cyclopentadiene, 5-ethylidene-2-norbornene, 5-butylidene-2-norbornene, 2-isopropenyl-5-norbornene, and the like can be given.

As specific examples of the copolymer, an ethylene-propylene copolymer, an ethylene-1-butene copolymer, an ethylene-1-octene copolymer, an ethylene-propylene-1,4-hexadiene copolymer, an ethylene-propylene-5-ethylidene-2-norbornene copolymer, and the like can be given.

As examples of the polymer block Y before hydrogenation, polybutadiene including at least one group selected from the group consisting of a 2-butene-1,4-diyl group and a vinylethylene group as the monomer unit, and polyisoprene including at least one group selected from the group consisting of a 2-methyl-2-butene-1,4-diyl group, an isopropenylethylene group, and a 1-methyl-1-vinylethylene group as the monomer unit can be given.

As another example of the polymer block Y before hydrogenation, an isoprene-butadiene copolymer including an isoprene unit and a butadiene unit as the main monomer units can be given, the isoprene unit being at least one group selected from the group consisting of a 2-methyl-2-butene-1,4-diyl group, an isopropenylethylene group, and a 1-methyl-1-vinylethylene group, and the butadiene unit being a 2-butene-1,4-diyl group and/or a vinylethylene group.

The arrangement of the butadiene unit and the isoprene unit may be a random arrangement, a block arrangement, or a tapered block arrangement.

As still another example of the polymer block Y before hydrogenation, a vinyl aromatic compound-butadiene copolymer including a vinyl aromatic compound unit and a butadiene unit as the main monomer units can be given, the vinyl aromatic compound unit being at least one monomer unit selected from styrene, α-methylstyrene, o-methylstyrene, m-methylstyrene, p-methylstyrene, 2,4-dimethylstyrene, vinylnaphthalene, and vinylanthracene, and the butadiene unit being a 2-butene-1,4-diyl group and/or a vinylethylene group.

The arrangement of the vinyl aromatic compound unit and the butadiene unit may be a random arrangement, a block arrangement, or a tapered block arrangement.

The hydrogenation state of the polymer block Y may be partial hydrogenation or complete hydrogenation.

The raw materials are easily available if the polymer block X of the hydrogenated derivative is polystyrene and the polymer block Y before hydrogenation is 1,2-polyisoprene, 3,4-polyisoprene, and/or 1,4-polyisoprene.

Since the styrene component is immiscible with the polypropylene resin or the like, a longer period of time is required to mix the styrene component with polypropylene as the amount of styrene component is increased. Therefore, when using a hydrogenated derivative containing a large amount of styrene component, it is preferable to sufficiently mix the styrene component and polypropylene in advance to prepare a masterbatch.

The raw materials are also easily available if the polymer block X of the hydrogenated derivative is polystyrene and the polymer block Y before hydrogenation is 1,2-polybutadiene and/or 1,4-polybutadiene.

The alkoxysilane or alkylsilane compound is shown by the following structural formulas.

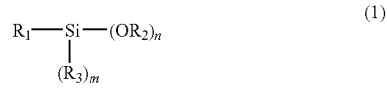

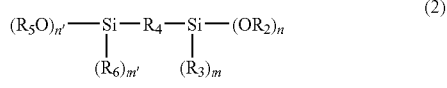

$R_1$ represents hydrogen, nitrogen, or a linear or branched alkyl group or alkenyl group.

$R_1$ may have a terminal functional group. When $R_1$ is an alkyl group which does not have a terminal functional group, the alkoxysilane or alkylsilane compound exhibits high permeability into a bonding surface formed by a resin composition having a low crystallinity and including the polypropylene resin and the hydrogenated derivative of the block copolymer of the general formula X-Y, whereby bonding strength is increased.

$R_2$ and $R_3$ represent alkyl groups having about 1 to 3 carbon atoms, and n, n', m, and m' represent 0, 1, 2, or 3, provided that n+m=3 and n'+m'=3.

$R_4$ represents an alkylene group, and may be a group in which two alkylene groups are bonded through a functional group.

The alkoxysilane or alkylsilane compound functions as an adhesive.

Bonding strength is improved by adding the hydrogenated derivative of the block copolymer of the general formula X-Y (X is a polymer block immiscible with the polypropylene resin, and Y is a conjugated diene elastomer polymer block) to the adhesive formed of the alkoxysilane or alkylsilane compound and dissolving the derivative in the adhesive.

According to another embodiment of the invention, a microproduct may include N structures (N is an integer equal to or larger than three).

In this case, the structure and the silane compound illustrated for the microstructure may be applied.

At least one of the N structures may be formed of a polypropylene resin and a hydrogenated derivative of a block copolymer of the general formula X-Y (X is a polymer block immiscible with the polypropylene resin, and Y is a conjugated diene elastomer polymer block) (hereinafter may be called "structure resin composition"). In this case, bondability with the structure resin compositions forming the opposed bonding surfaces is improved by adding a hydrogenated derivative of a block copolymer of the general formula X-Y (hereinafter called "bonding elastomer") to the alkoxysilane or alkylsilane compound and dissolving the derivative in the compound, whereby bonding strength is further improved.

The method of molding the structure resin composition is not particularly limited. It is preferable to use injection molding or the like exhibiting a low resin orientation.

The structure resin composition including the polypropylene resin and the hydrogenated derivative of the block copolymer of the general formula X-Y (elastomer) exhibits excellent wettability with a water-soluble liquid due to hydrophilicity, allows a liquid containing cells injected into a channel to flow advantageously, and exhibits excellent applicability to a microstructure. Since the silane compound is caused to permeate or adhere to the bonding surfaces of the structures and the bonding surfaces are bonded by heating, an excellent microstructure and microproduct are obtained in which leakage of liquid is prevented.

When the structures to be bonded are formed of the structure resin composition, bonding strength is further improved by adding the bonding elastomer to the silane compound.

According to a further embodiment of the invention, there is provided a microproduct used for biochemistry or biotechnology, the microproduct being formed of a resin composition including a polypropylene resin and a hydrogenated derivative of a block copolymer of the following general formula X-Y (X is a polymer block immiscible with the polypropylene resin, and Y is a conjugated diene elastomer polymer block), and comprising a channel groove with a width and a depth each having 0.3 to 200 µm.

A resin composition was prepared using a polypropylene resin random copolymer (J-3021GR for injection molding manufactured by Idemitsu Kosan Co., Ltd., MFR: 33 g/10 min, density: 0.9 g/cm$^3$, Young's modulus: 1000 MPa, flexural modulus of elasticity: 1000 MPa, Rockwell hardness: 76R) and a hydrogenated derivative (Hybrar 7311S manufactured by Kuraray Co., Ltd., hydrogenated polystyrene-vinyl-polyisoprene-polystyrene block copolymer, styrene content: 12 wt %) as a second synthetic resin component while changing the mixing ratio, and a bondability evaluation test sample shown in FIG. 3 was injection-molded.

The test sample was formed by bonding a first structure 1 and a second structure 2 under various conditions.

A channel 1c with a depth of 50 µm, a width of 50 µm, and a length of 14 mm, an ink injection section 1a, and an ink storage section 1b were formed in the first structure, and an ink injection port 2a and an ink storage section 2b were formed in the second structure 2 corresponding to the structure 1.

The microstructure thus produced was evaluated as follows.

Specifically, red ink (Xstamper refill manufactured by Shachihata Inc.) was injected through the ink injection section 1a and caused to flow toward the ink storage section through the channel. A channel breakage pressure at which the ink leaked into the bonded section (schematically indicated by ink leakage 3 in FIG. 3) was measured.

The evaluation results are shown in FIG. 1.

Bondability was evaluated by the spread state of a test liquid containing an alcohol and ink at a mixing ratio of 50:50(%).

Rank 0: Ink spreads within one day through natural streaming.
Rank 1: Ink spreads within one to seven days through natural streaming.
Rank 2: Ink does not spread within seven days through natural streaming.
Rank 3: Ink spreads at a liquid pressure of 0.2 MPa or more and less than 0.4 MPa.
Rank 4: Ink spreads at a liquid pressure of 0.4 MPa or more and less than 0.6 MPa.
Rank 5: Ink spreads at a liquid pressure of 0.6 MPa or more and less than 0.8 MPa.
Rank 6: Ink does not spread when repeatedly conducting the test about five times at a liquid pressure of 0.6 MPa.
Rank 7: Ink does not spread when repeatedly conducting the test 10 times or more at a liquid pressure of 0.6 MPa.
Rank 8: Ink does not spread when repeatedly conducting the test 20 times or more at a liquid pressure of 0.6 MPa.

FIG. 2 shows the evaluation results of a permeation test of a silane compound into a structure. In the permeation test, a change in weight of the structure before and after immersing the structure in the silane compound was measured. The higher the weight increase rate, the higher the permeability.

The structure used for the permeation test contained a hydrogenated derivative (elastomer) in an amount of 50%.

In FIG. 1, when bonding the structures immediately after molding, the bondability evaluation was the Rank 0 at a hydrogenated derivative mixing ratio of 20% or less. Bondability was improved by drying the structures before bonding.

It suffices that ink does not spread in a normal microstructure through natural streaming (Rank 1). It is preferable that the microstructure have the Rank 2 or more, and ideally the Rank 5 or more from the viewpoint of reliability.

Therefore, the mixing ratio of the hydrogenated derivative may be 5 to 70% in practice. The mixing ratio of the hydrogenated derivative is preferably 30 to 66%.

As shown in FIG. 2, it was found that the silane compounds having high permeability into the bonding surface formed by the structure resin composition, such as hexamethyldisilazane and isobutyltrimethoxysilane, exhibit excellent bondability.

Figure 5A:
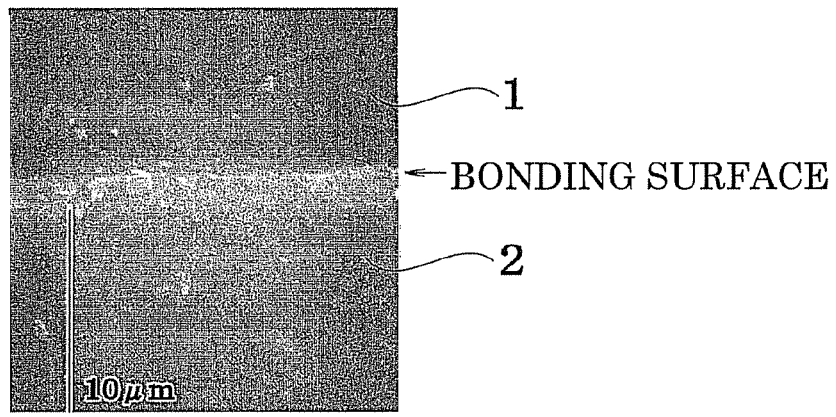
FIGS. 5A to 5C shows micrographs of bonding surfaces.
Figure 5B:
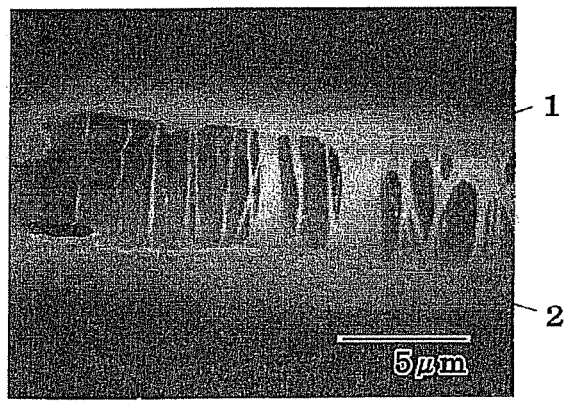
Figure 5C:
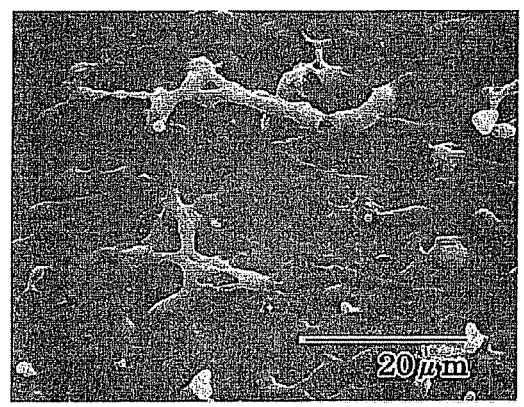

FIGS. 5A to 5C show micrographs of the bonding surfaces of the structures 1 and 2 of the sample number 10 (bondability rank: 8) shown in FIG. 1. FIG. 5B is a photograph showing a state in which the bonding surfaces shown in FIG. 5A were separated to a distance of about 5 µm. Specifically, the bonding surfaces were separated so that the surface of the structure resin composition was partially stretched. FIG. 5C is a photograph of the surface of the separated structure taken at an angle of about 45°.

Figure 4:
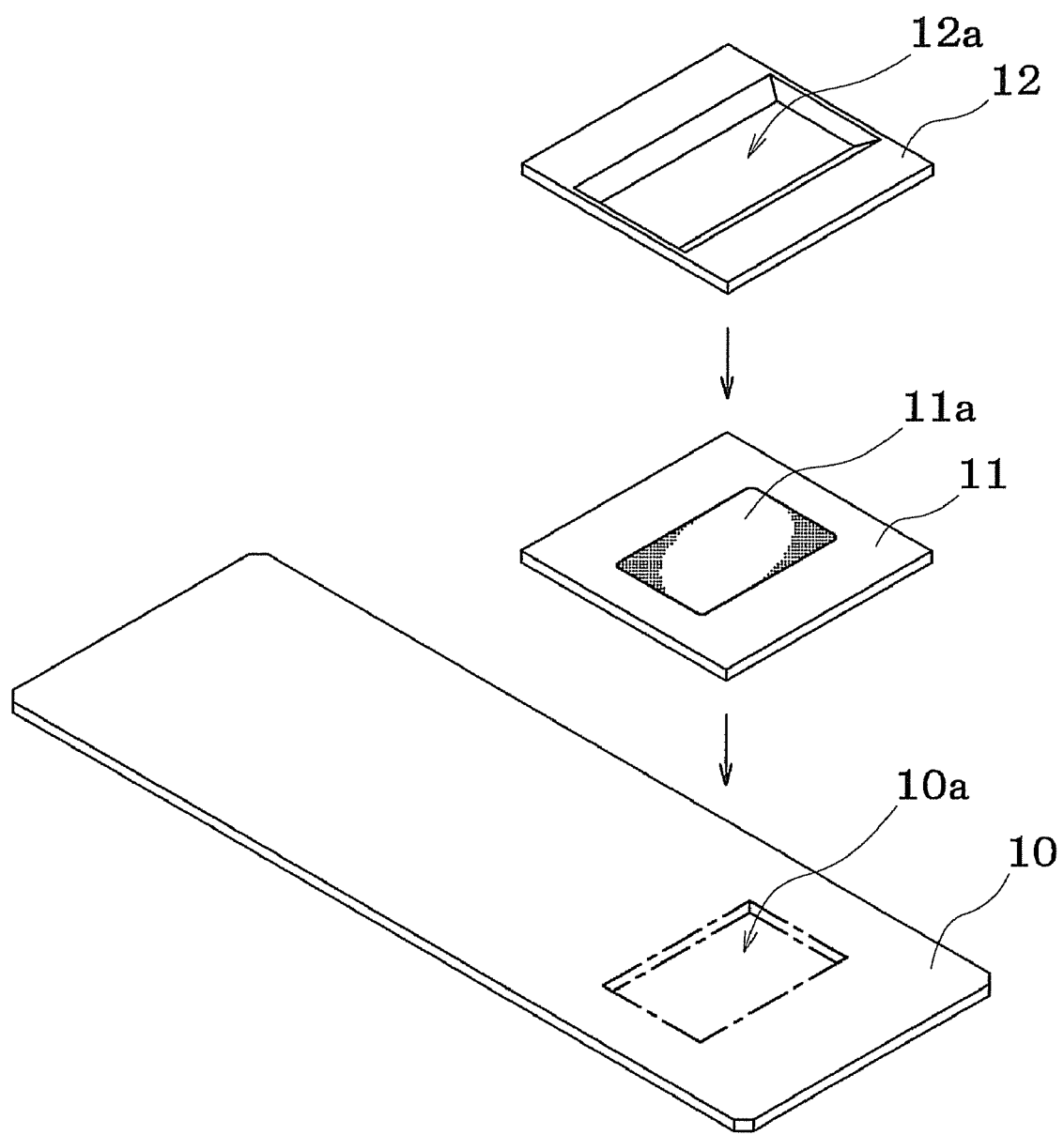
FIG. 4 shows an example of a microproduct.

FIG. 4 shows an example of a combination of a microwell array chip and a liquid leakage preventive frame as a microproduct.

FIG. 4 shows an example in which a microwell array chip 11 in which a microwell region 11a is formed and a liquid leakage preventive frame 12 in which an opening 12a is formed are bonded using a silane compound.

Several hundreds to several millions of microwells with a diameter of 10 to 30 µm and a depth of 10 to 20 µm are arranged at a pitch of 15 to 30 µm.

Leakage of a test liquid was reliably prevented by bonding the liquid leakage preventive frame 12 to the microwell array chip 11 using the silane compound.

Since the liquid leakage preventive frame 12 can be bonded to the microwell array chip 11 using the silane compound, leakage of a test liquid placed in the opening 12a does not occur. A chip holder 10 installed in a detection device such as a microscope is not particularly limited insofar as the microwell array chip 11 can be positioned. A slide or a holder made of a resin or a metal may be used as the chip holder 10. The microwell array chip 11 and the chip holder 10 may be bonded using the silane compound.

The chip holder 10 may also be used for a transmission detection device by forming an opening 10a indicated by an imaginary line in the chip holder 10.

The results in which bonding strength was evaluated by peeling force are given below.

Figure 6:
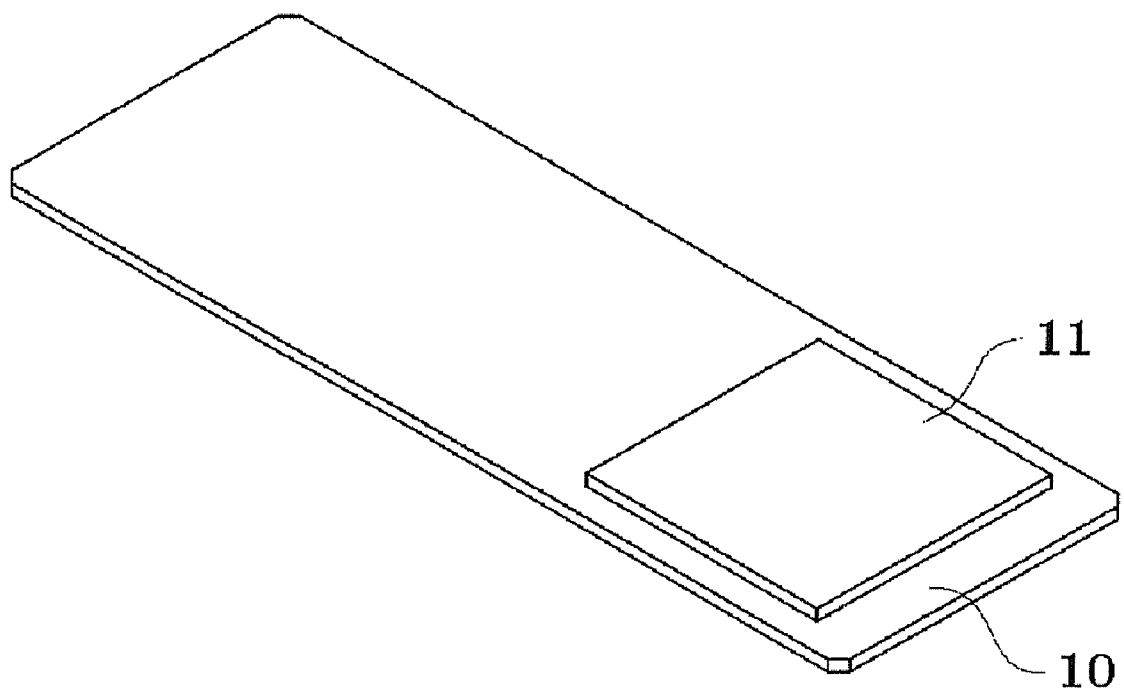
FIG. 6 shows a sample subjected to T-peeling bonding strength evaluation.

As shown in FIG. 6, a first structure 10 and a second structure 11 were bonded using a silane compound or a mixture obtained by adding a bonding elastomer to a liquid silane compound.

The tensile T-peeling force was evaluated from one side of the resulting specimen.

Figure 7:
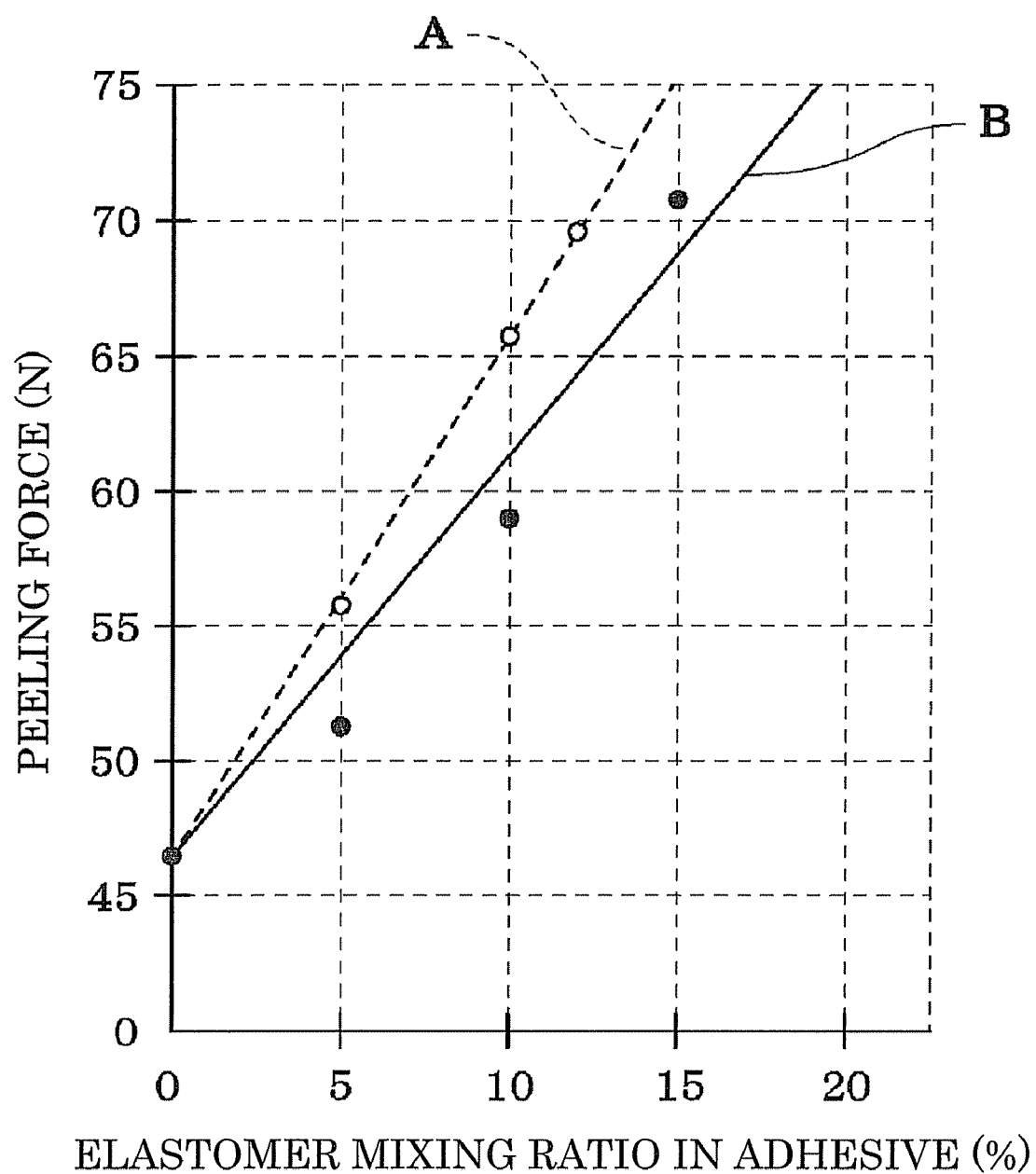
FIG. 7 shows peeling force evaluation results.

The results are shown in FIG. 7.
(Measuring Instrument)
Digital force gauge BS-20R manufactured by Imada Co., Ltd.
(Measuring Method)
The T-peeling force of the second structure with a length of 21 mm, a width of 21 mm, and a thickness of 0.6 mm was measured.
(Material for Structure)
As the structure resin composition for the first and second structures, a resin composition prepared by mixing J-3021GR and the elastomer Hybrar 7311S at a ratio of 1:1 was used.

Liquid isobutyltrimethoxysilane was used as the silane compound. Hybrar 7311S (graph A) or Dynaron 1321P manufactured by JSR Corporation (hydrogenated polystyrene-butadiene, styrene content: 10%) (graph B) were dissolved in the silane compound as the elastomer while changing the mixing ratio (mass %). After applying the resulting solution to the bonding surface, the solution was allowed to dry for about 10 minutes, heated at 110° C. for about two hours, and allowed to cool. The peeling force was then measured. The graph in FIG. 7 shows the peeling force measurement results.

It was confirmed that bonding strength was improved by adding the bonding elastomer to the silane compound.

In the invention, although a practical bonding strength can be obtained without adding the bonding elastomer, it is preferable to add the bonding elastomer to the silane compound. The bonding elastomer is dissolved in isobutyltrimethoxysilane at 50° C. to a concentration of about 25 mass %.

The amount of bonding elastomer added is preferably 5% or more from the viewpoint of the effect of addition. If the amount of bonding elastomer added is too great, the viscosity of the solution is increased. The amount of bonding elastomer added is preferably 15% or less from the viewpoint of applicability.

Figure 8:
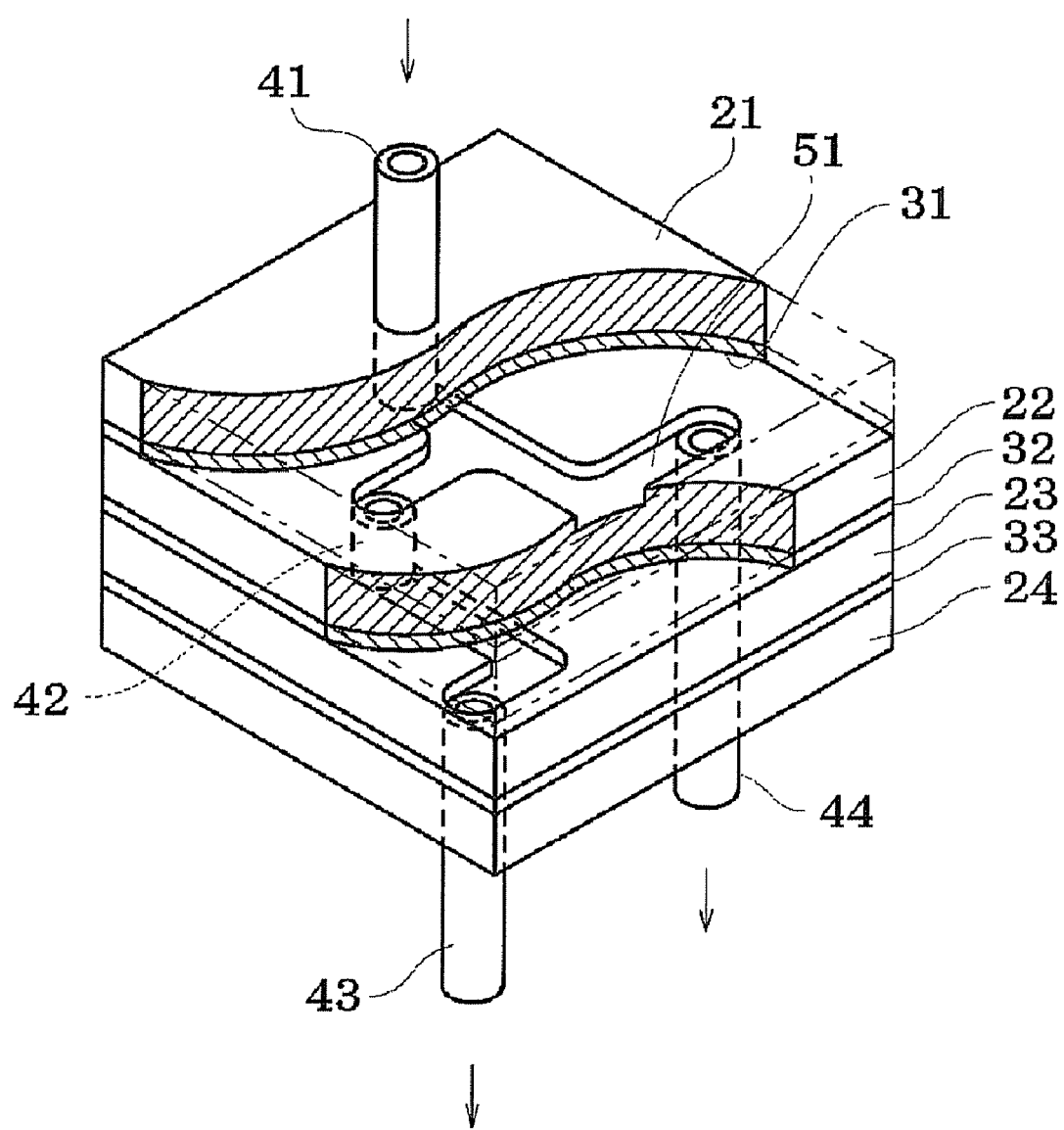
FIG. 8 shows an example in which structures are bonded.

FIG. 8 shows an application example of the structure according to the invention. FIG. 8 shows an example of a structure including N structures (N is an integer equal to or larger than three) and (N−1) bonding surfaces.

A reaction channel, a reaction chamber 51, and the like are formed using structures 22, 23, and 24. The bonding surfaces of the structures 22, 23, and 24 are bonded through bonding layers 31, 32, and 33 according to the invention together with a cover structure 21. A liquid inlet tube 41 and outlet tubes 43 and 44 are attached to the three-dimensional structure. These tubes may also be formed of the structure resin composition.

Note that FIG. 8 schematically shows a thick bonding layer.

Figure 9A:
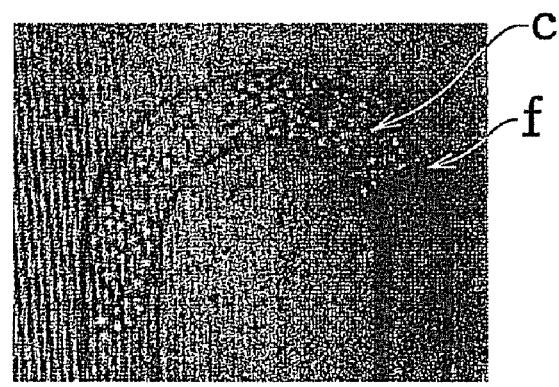
FIGS. 9A and 9B show the flow of a liquid containing cells.

FIG. 9A shows an example of a photograph showing a state in which mouse B lymphocytes c (number of cells: $1\times10^7$ cells/mL) are allowed to flow together with a cell fluid (10% FCS, RPMI buffer) through a channel (50×50 µm) in a bonded structure produced using the structure resin composition without applying pressure.

Figure 9B:
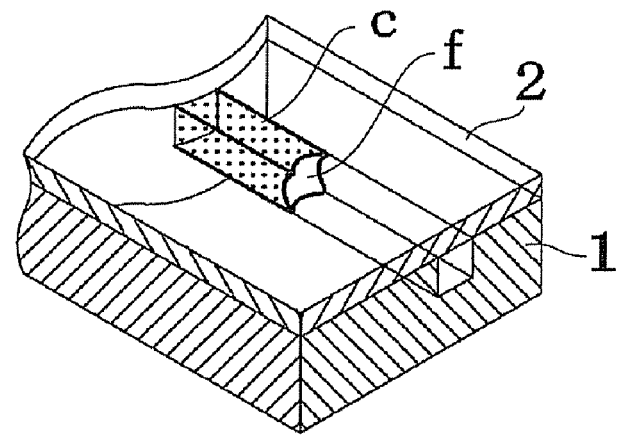

FIG. 9B schematically shows a section around a liquid surface f.

The individual B lymphocytes are uniformly dispersed without adhering to the channel wall, and a liquid surface f forms a depressed surface with respect to the flow direction.

Therefore, the invention is suitable for a microproduct which handles cells.

According to the invention, even if a minute microwell, microchannel, or the like is formed in the bonding surfaces of the structures, the structures can be bonded while maintaining the microstructure. Moreover, the structure according to the invention exhibits excellent wettability with a cell fluid. Therefore, the invention is suitably applied to a microstructure and a microproduct used in the fields of biochemistry, biotechnology, optics, electronics, and the like.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A microproduct formed of a resin composition including a polypropylene resin and a hydrogenated derivative of a block copolymer of the following general formula X-Y (X is a polymer block immiscible with the polypropylene resin, and Y is a conjugated diene elastomer polymer block), a mixing ratio of the hydrogenated derivative being 30 to 66%, and comprising a channel groove with a width and a depth each of 0.3 to 200 µm, the channel groove exhibiting excellent wettability with a water-soluble liquid therein.

2. The microproduct as defined in claim 1, wherein the polymer block X of the hydrogenated derivative of the resin composition is polystyrene, and the polymer block Y before hydrogenation is 1,2-polyisoprene, 3,4-polyisoprene, and/or 1,4-polyisoprene.

3. The microproduct as defined in claim 1, wherein the polymer block X of the hydrogenated derivative of the resin composition is polystyrene, and the polymer block Y before hydrogenation is 1,2-polybutadiene and/or 1,4-polybutadiene.

* * * * *